United States Patent
Pittman

(10) Patent No.: US 7,604,079 B2
(45) Date of Patent: Oct. 20, 2009

(54) POWER DRIVE FOR A BICYCLE

(76) Inventor: Jack Ray Pittman, 28285 Tristan Dr., Punta Gorda, FL (US) 33955

( * ) Notice: Subject to any disclaimer, the term of this patent is extended or adjusted under 35 U.S.C. 154(b) by 88 days.

(21) Appl. No.: 12/069,551

(22) Filed: Feb. 12, 2008

(65) Prior Publication Data

US 2009/0200096 A1 Aug. 13, 2009

(51) Int. Cl.
*B62M 23/02* (2006.01)
(52) U.S. Cl. .................. 180/205; 180/206; 180/207; 180/220; 180/223; 180/226
(58) Field of Classification Search .............. 180/220, 180/223, 226, 205–207; 280/205, 207, 220
See application file for complete search history.

(56) References Cited

U.S. PATENT DOCUMENTS

| | | | | |
|---|---|---|---|---|
| 2,574,824 A | * | 11/1951 | Garelli ................. | 180/221 |
| 3,339,659 A | * | 9/1967 | Wolf .................... | 180/221 |
| 3,912,039 A | * | 10/1975 | Ordemann ............. | 180/220 |
| 4,267,898 A | * | 5/1981 | Wheaton ............... | 180/205 |
| 4,364,448 A | * | 12/1982 | Ikuma .................. | 180/206 |
| 4,579,188 A | * | 4/1986 | Facer ................... | 180/211 |
| 4,685,692 A | * | 8/1987 | Fullilove et al. ...... | 280/234 |
| 4,950,971 A | * | 8/1990 | Hegi et al. ............ | 322/1 |
| 5,078,227 A | * | 1/1992 | Becker ................. | 180/221 |
| 5,078,416 A | * | 1/1992 | Keyes .................. | 280/260 |
| 5,224,725 A | * | 7/1993 | Erlston ................ | 280/259 |
| 5,332,244 A | * | 7/1994 | Turner et al. .......... | 280/230 |
| 5,390,946 A | * | 2/1995 | Spicer ................. | 280/259 |
| 5,602,448 A | * | 2/1997 | Yaguchi ............... | 318/139 |
| 5,758,735 A | * | 6/1998 | MacCready et al. ... | 180/206 |
| 5,992,553 A | * | 11/1999 | Morrison .............. | 180/206 |
| 6,062,329 A | * | 5/2000 | Chai ................... | 180/205 |
| 6,336,516 B1 | * | 1/2002 | McNelly .............. | 180/206 |
| 7,185,726 B2 | * | 3/2007 | Young ................. | 180/205 |

* cited by examiner

*Primary Examiner*—S. Joseph Morano
*Assistant Examiner*—Michael R Stabley
(74) *Attorney, Agent, or Firm*—Werner H. Schroeder

(57) ABSTRACT

An auxiliary power drive system is incorporated into a bicycle either as a retrofit or in initial construction. The power for the drive system is derived either from an electric motor or an internal combustion engine. The power developed by said motor or engine is delivered to the rear wheel of the bicycle by a flexible drive shaft which either drives a friction wheel operating on the tire of the rear wheel or to worm gear affixed to the rear wheel. The flexible drive shaft includes a friction clutch which discontinues the power of the drive shaft from driving the rear wheel when normal pedaling is resumed. The flexible drive shaft also includes a telescoping coupling to compensate any change in lengths of the drive shaft due to impacts on the rear wheel caused by the terrain the bicycle is riding on.

13 Claims, 6 Drawing Sheets

POWER DRIVE FOR A BICYCLE

BACKGROUND OF THE INVENTION

The inventive concept is directed to an auxiliary drive for bicycles. It is well known that bicycles are driven by the leg power of the occupant. The occupant simply is pedaling a pedal wheel which transmits that motion to the rear wheel of the bicycle by way of a chain. In many instances that pedal power is augmented by a transmission which alters the pedal power requirement by shifting the chain drive to different pinion ratios on the rear wheel. Auxiliary power drives are well known by using electric motors which add extra power to either the front or the rear wheel through the use of friction drives.

BRIEF DESCRIPTION OF THE INVENTION

The inventive concept involves a somewhat more sophisticated drive by either using an electric power drive or by deriving the power from an internal combustion engine. Either power source is kept in the vicinity at the front or the middle of the vehicle and the power source is transmitted to the rear wheel of the bicycle by either a friction drive or a worm gear drive at the axle of the bicycle. The electric power is derived from batteries that may by recharged by solar power or the combustion engine has a fuel storage tank built into the frame of the bicycle or attached to a horizontal bar on the bicycle.

DETAILED DESCRIPTION OF THE INVENTION

Figure 1:
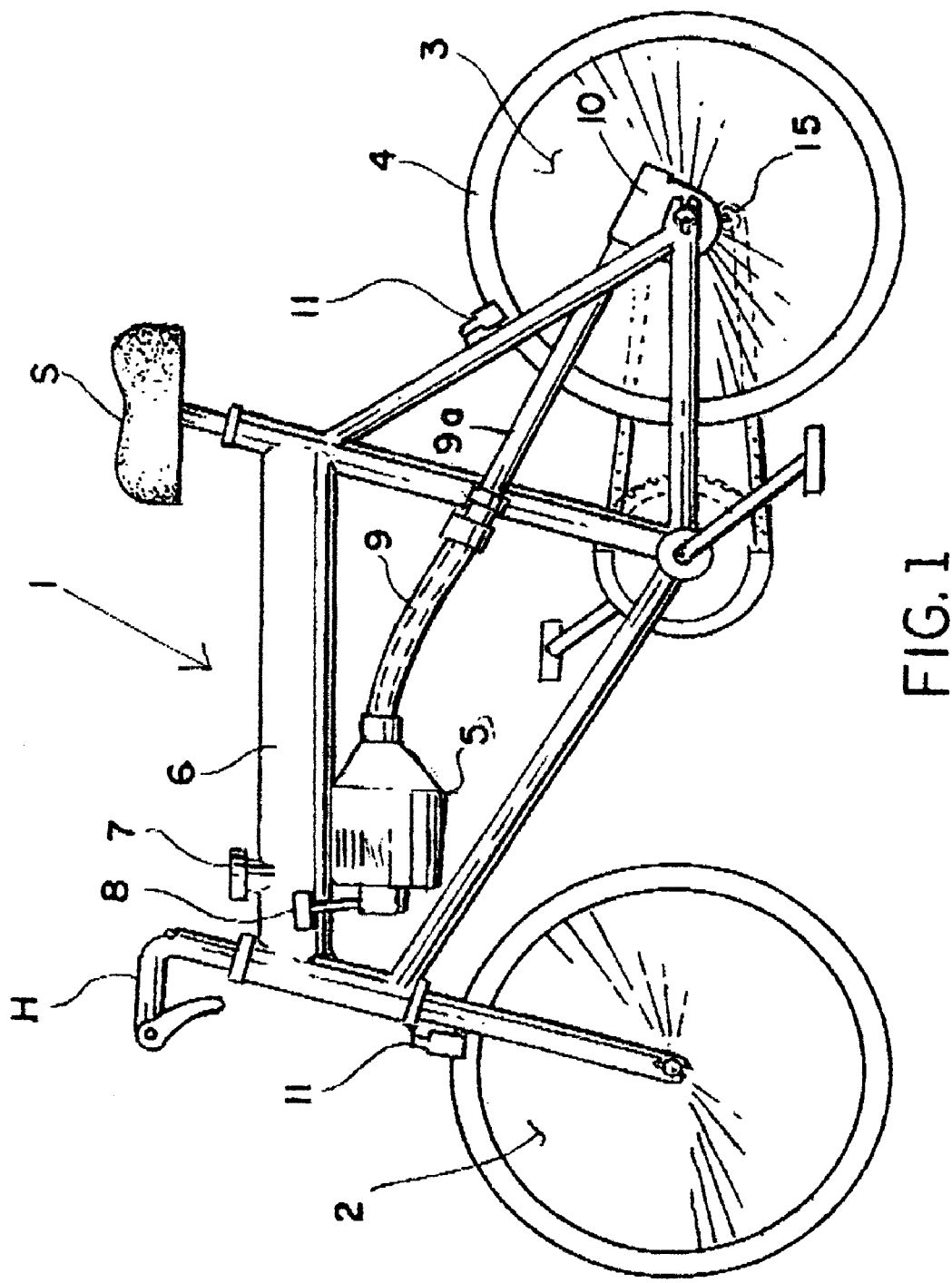
FIG. 1 illustrates a combustion engine mounted on the bicycle driving The rear wheel by way of a worm gear.
Figure 6:
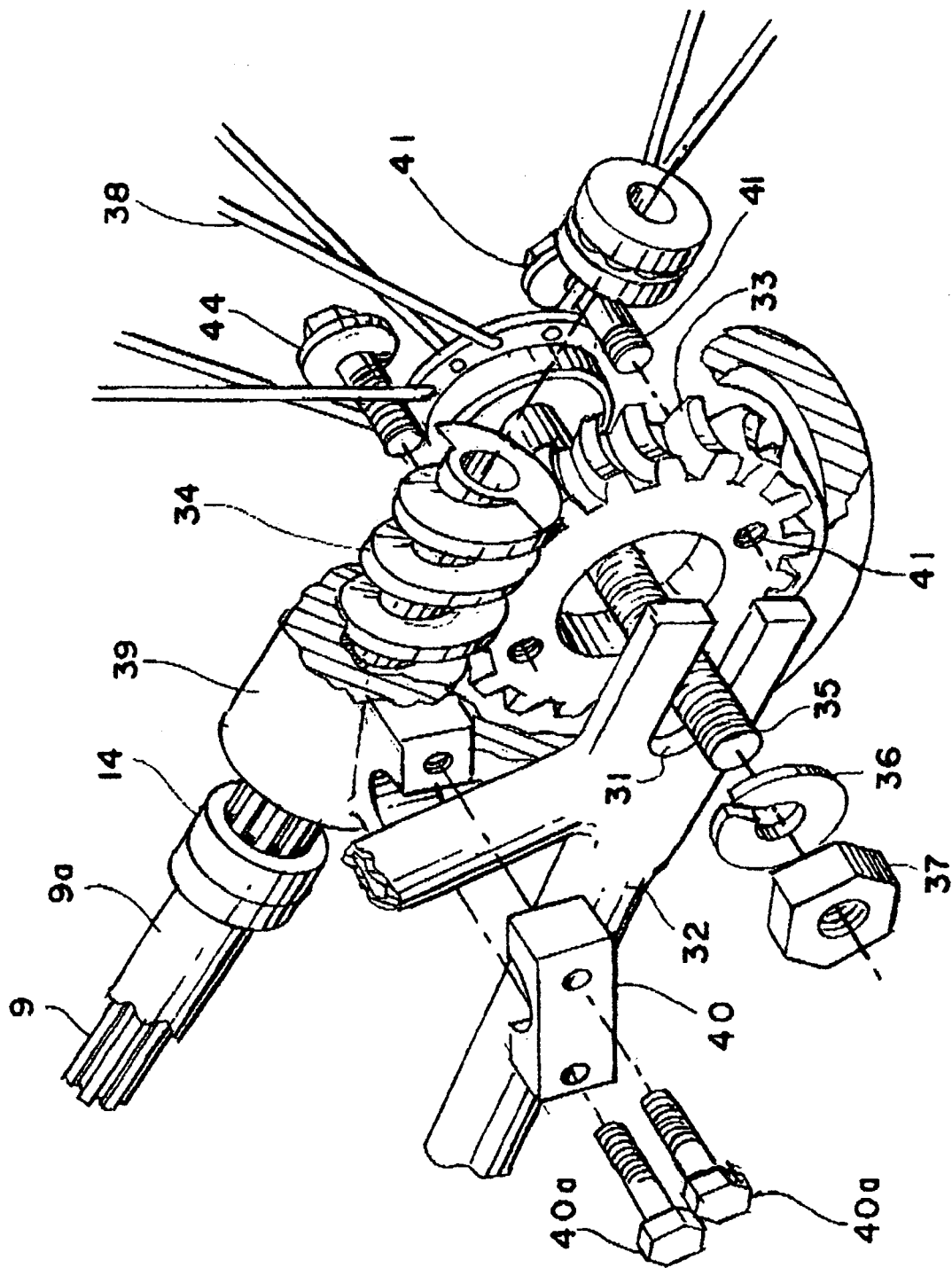
FIG. 6 shows details of a worm gear drive to a wheel.

FIG. 1 illustrates an auxiliary power drive on a bicycle 1 by using an internal combustion engine mounted substantially midway on the horizontal bar of bicycle 1. The bicycle 1 consists of a handle bar H and a saddle S which is well known. There is a front wheel 2 and a rear wheel 3 having a tire 4 thereon. The internal combustion engine 5 is suspended or mounted on a horizontal bar of the bicycle. In the showing in FIG. 1, the horizontal bar is replaced by a fuel tank 6 which is built into the bicycle. In alternative arrangement the fuel tank could be made separately and instead could be suspended from the existing horizontal bar in a retrofit mode. FIG. 1 shows a filler cap 7 on the fuel tank 6 and the internal combustion engine 5 has a pull-start handle 8. The internal combustion engine 5 could be derived from the well known weed-eater arrangement which has a direct drive. The direct drive shaft from the engine will be connected a flexible drive shaft 9 which continues to the rear wheel 3. The flexible drive shaft 9 should be encased in a tubing as is shown at 9a. This concealment acts as a safety feature so that clothing, hair or manual contact is avoided. The flexible drive shaft ends in a worm gear drive 10 and drives directly to the axle of the rear wheel. Details of the worm gear are shown in FIG. 6 below.

Figure 2:
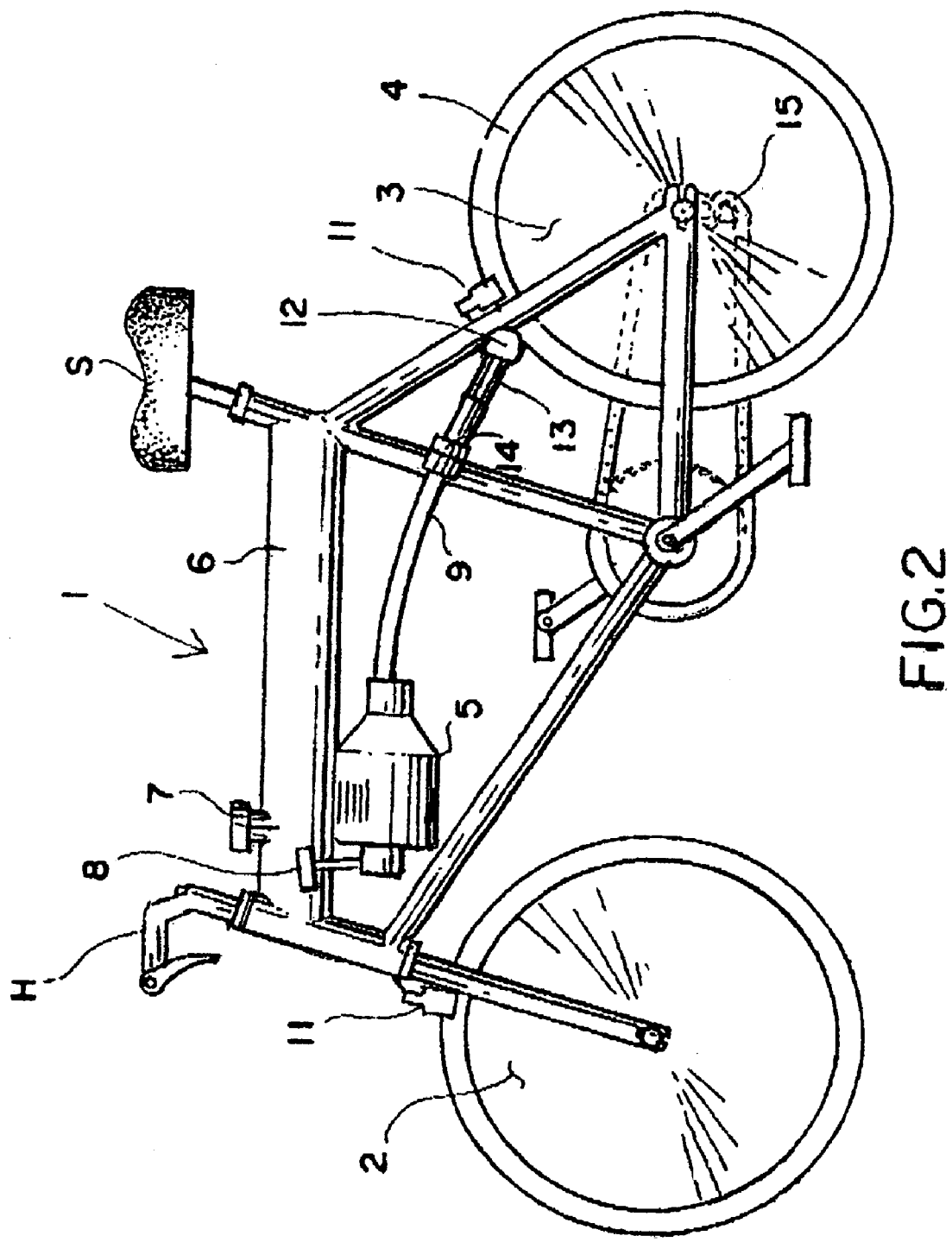
FIG. 2 shows the bicycle of FIG. 1 driving the rear wheel by way of Friction.
Figure 5:
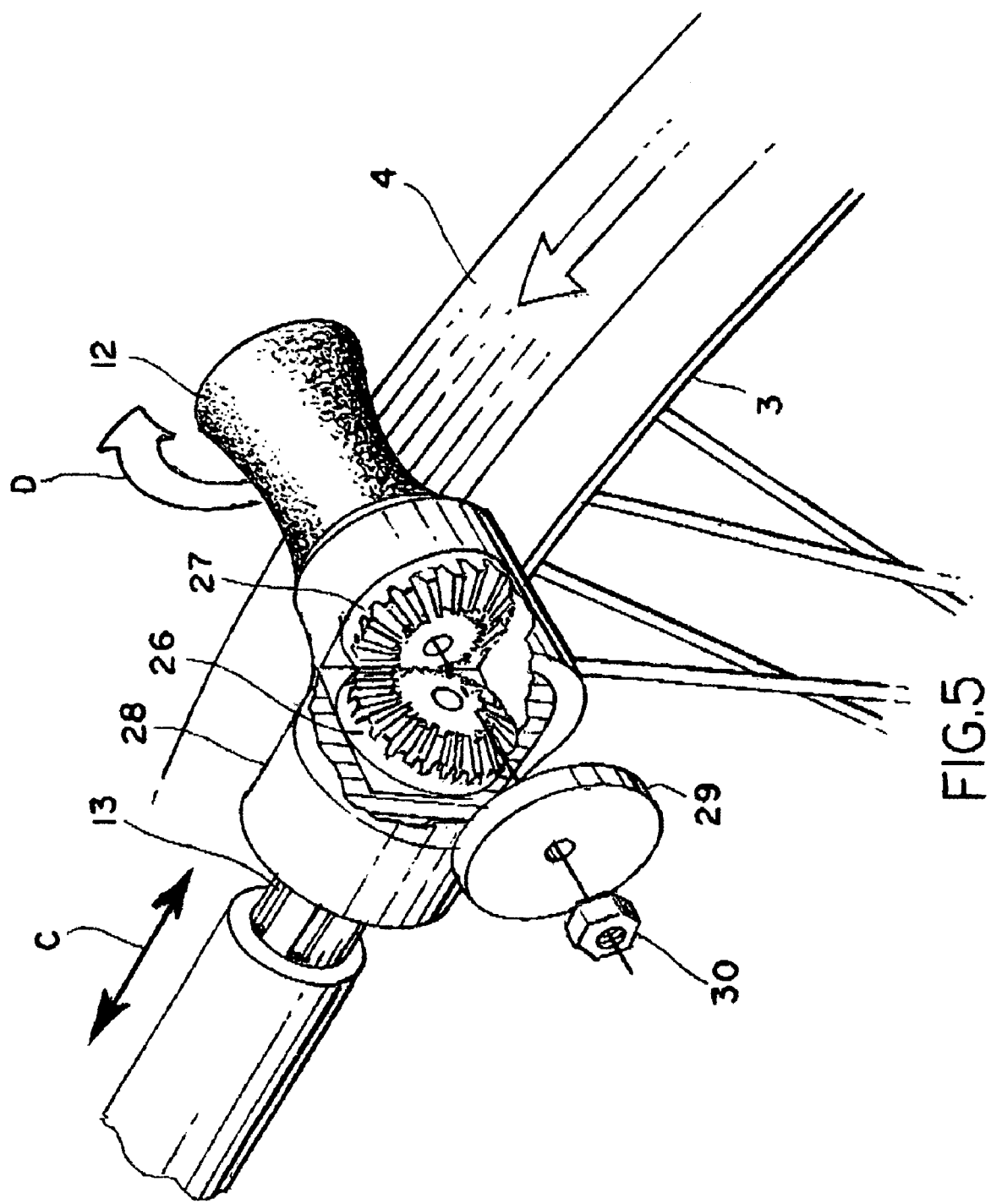
FIG. 5 shows details of a friction drive to a wheel.

FIG. 2 illustrates the same arrangement as was explained in FIG. 1 and the same reference characters are incorporated in this FIG. 2. A difference in this FIG. 2 is the drive to the rear wheel by way of a friction wheel drive 12 which drives on the tire 4 by way of friction. The combustion engine 5 drives the friction wheel 12 by way of the flexible drive shaft 9 as was explained in FIG. 1. This illustration FIG. 2 also shows the brakes of the bicycle at 11. The details of the friction wheel drive are shown in FIG. 5 below. In order to be able to discontinue the drive to the friction wheel 12 there is a telescoping coupling 13 incorporated at the end of the drive shaft. A simple mechanical pull will telescope the drive to the friction wheel 12 into the coupling and disconnect the drive to the rear wheel. Such telescoping drives are well known in road vehicles having a rear wheel drive acting in a telescoping manner when the rear axle of the vehicle moves up and down. Also in FIG. 2 there is located a centrifugal clutch at the end of the drive shaft 9. Having the centrifugal clutch 14 close to the end of the drive shaft and close to the friction drive renders the system more efficient. The centrifugal clutch acts beneficially when the bicycle is in coasting mode whereby the entire drive shaft is disconnected and the rear wheel in a coasting mode does not have to drive the entire shaft including the engine whether internal combustion or electric which normally operate in unison when under power. Also shown in FIG. 2 is the well known chain drive transmission 15 which shifts the chain to different pinion ratios which is well known.

Figure 3:
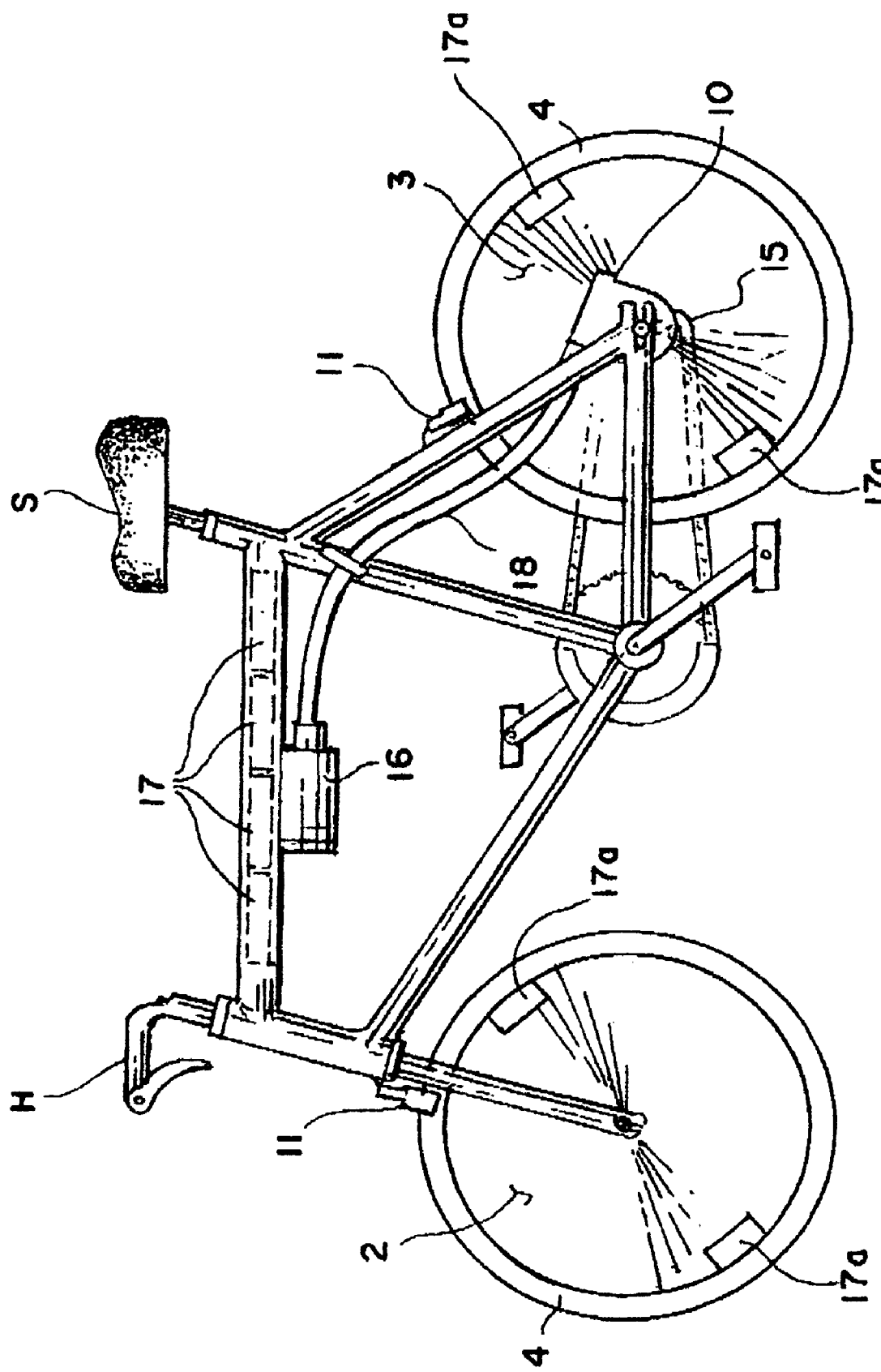
FIG. 3 illustrates an electric motor driving the rear wheel by way of a worm gear.

FIG. 3 shows a bicycle with an electric drive motor 16. Again, the same reference characters are being applied to the elements of the bicycle as was explained with regards to FIGS. 1 and 2. In this FIG. 3 there is shown an electric motor 16 which derives its power from the batteries 17 which are located inside the horizontal shaft or may be located in a separate container (not shown) suspended from the horizontal bar present in almost all bicycles. The batteries should be of the rechargeable type but will have to removed from the bicycle for that purpose or a charger my be applied to the batteries while in situ. The batteries 17 can also be recharged by solar panels 17a which are located in the spokes of the bicycle. At the same time, the solar panels can act as reflectors which is well known. The power derived from the electric motor 16 will be transmitted to the rear wheel be way of a flexible drive 18 encased in a tubing. The drive from the drive shaft 18 is applied to the rear wheel by way of a worm drive 10 as was shown in FIG. 1. The details of this drive will also be shown in FIG. 6. FIG. 3 again shows the well known chain drive transmission 15 and the brakes 11.

Figure 4:
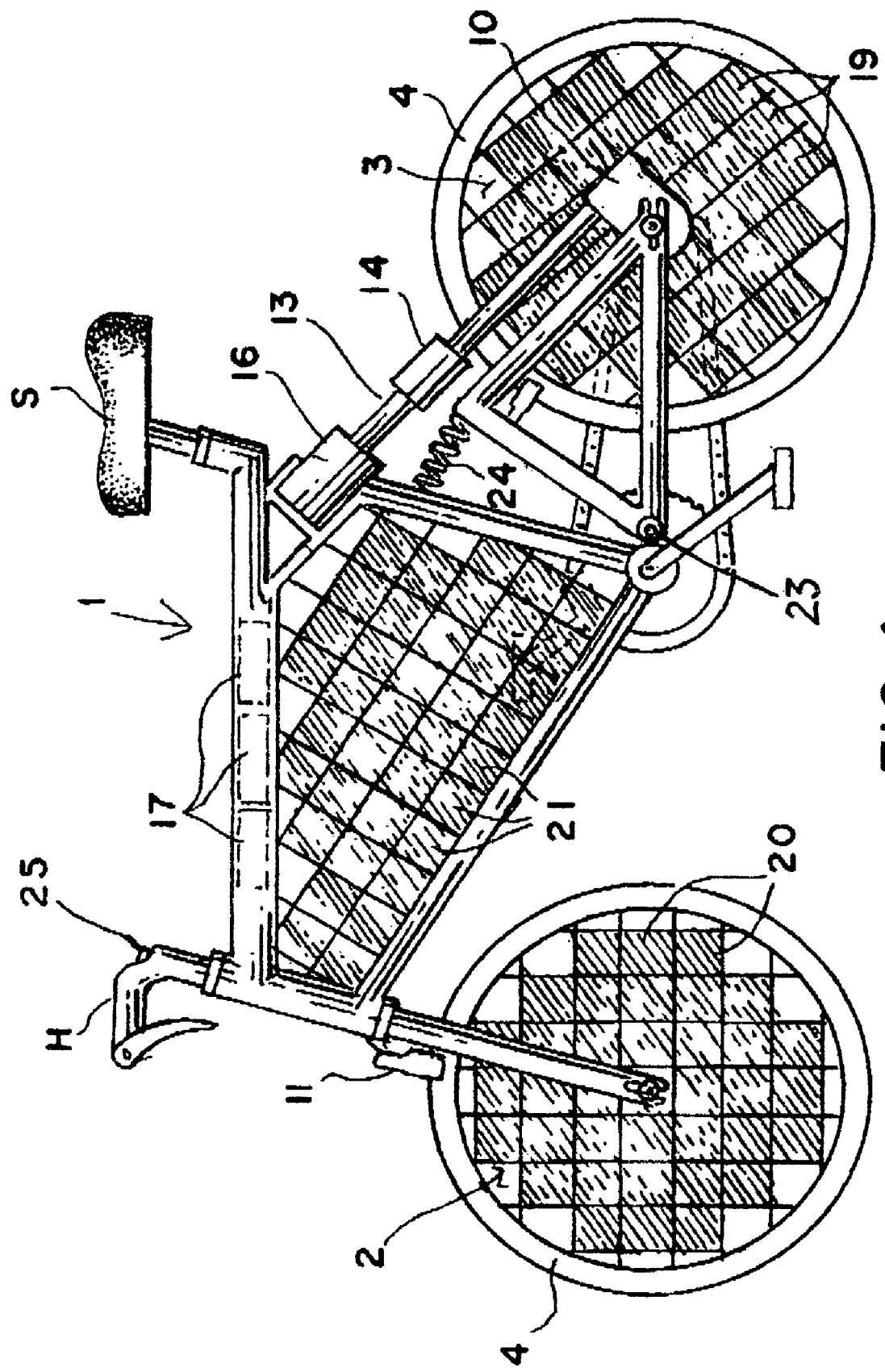
FIG. 4 shows the use of solar energy to recharge the batteries.

FIG. 4 illustrates a differently constructed bicycle having the handle bar H and the saddle S. The rear wheel in this bicycle is of the pivoting type having its pivoting point at 23. The triangular support frame of the rear wheel will pivot around this pivot point 23 as the terrain on which the bicycle is riding changes. The pivoting and the shocks associated therewith are absorb by the shock absorber spring 24. The rear wheel drive in this FIG. 4 is derived from an electric motor 16 which has a direct drive to the rear wheel by way of a worm gear 10, which was explained above in FIG. 1. The electric system can be controlled by a switch 25 located on the handle bar H. The switch could be a rheostat to control the speed of the bicycle. The direct drive to rear wheel worm gear 10 has a telescoping section 13 incorporated therein because the supporting pivoting frame of the rear wheel will shorten or lengthen the drive and the telescoping section 13 of the drive shaft will follow this movement and compensate for the same. At 14 is also shown a centrifugal clutch, the action of which was explained above by having reference to FIG. 2. The batteries contained in the electric motor 16 or in the horizontal bar at 17 are recharged or kept in charge by the solar energy panels which are placed within the circumference of the wheels of the rear wheel 3 at 19, the front wheel 2 at 20 and within the frame of the bicycle at 21. This type of construction creates a very versatile bicycle which can operate a long time on solar power as long as sunshine is prevailing.

FIG. 5 illustrates the details of the friction wheel drive. Previously identified elements received the same reference characters as were assigned to them. Thus, FIG. 5 shows the wheel 3 with its tire 4 thereon. The friction wheel itself is shown at 12. It is preferred to construct this wheel by having a concave center. This assures a good contact between the friction wheel 12 and tire 4. There is a housing 28 which supports two bevel gears. There is a driving bevel gear 26 and a driven bevel gear 27. The driving bevel gear receives its rotation from the flexible drive shaft 9, shown in FIGS. 1 and 2. The driven bevel gear is attached to a gear drive shaft (not shown) which is held in place by the washer 29 and the lock nut 30. The friction wheel 12 rotates in the direction as indicated by the arrow D. Also shown in FIG. 5 is the telescoping coupling 13 which slides within the coupling as indicated by the arrow C. The telescoping coupling 13 operates to equalize any changes in lengths between the flexible drive shaft and the wheel 3.

FIG. 6 shows the details of the worm gear drive 10 as shown in FIGS. 3 and 4. The flexible drive shaft 9 in its housing 9*a* is shown in previous Figs. The drive shaft 9 drives the worm gear 34 which is supported in the housing 39,40 which is secured to the bicycle frame 32 by way of bolts 40*a*. The worm gear 34 drives the worm gear pinion 33 which is attached to the spokes 38 of the bicycle wheel by way of bolts 41 which will be fastened in the bore holes 41 of the gear 33. The wheel axle 35 is fastened in the fork 31 of the bicycle, which is well known.

It can now be seen that the auxiliary power drive for a bicycle can be retrofitted to any bicycle or the bicycle can be constructed with the auxiliary power from the beginning. The bicycle can be used for pedaling only, if one so desires. In this case the centrifugal clutch, shown in various Figs., will remove the drag of the power train from the pedaling force and interfere therewith. Also the chain transmission or the normal gear shift 15 can be used by the rider because the power train is disconnected from the power drive by way of the centrifugal clutch.

The electric motor should be a DC motor. The internal combustion engine can take many forms such as 2-cycle or 4-cycle engine. The internal combustion engine could be fueled by propane gas. The internal combustion engine could be a diesel engine fueled by bio-fuel.

What I claim is:

1. An auxiliary power drive system for a bicycle including a power engine mounted substantially at the front of said bicycle, a flexible drive shaft constituting a power train delivers a power from said power engine to the rear wheel of said bicycle, a telescoping coupling is mounted within said power drive train to compensate for any differences of lengths in the drive shaft due to movements of rear wheel of said bicycle over an uneven terrain said bicycle rides on.

2. The auxiliary power drive system of claim 1, wherein said power engine is an internal combustion engine.

3. The auxiliary power drive system of claim 1, wherein said power engine is an electric motor.

4. The auxiliary power drive system of claim 3, wherein said electric motor is operated by rechargeable batteries.

5. The auxiliary power system of claim 4, wherein said batteries are rechargeable by solar energy.

6. The auxiliary power system of claim 1, wherein said power train delivers power to a friction wheel in contact with a tire on said rear wheel.

7. The auxiliary power system of claim 1, wherein said power train delivers power to a worm gear system fastened to said rear wheel.

8. The auxiliary power drive system of claim 1, wherein a centrifugal clutch is placed within said power train to remove the power of said power train from driving said bicycle when normal pedaling is used to operate said bicycle.

9. The auxiliary power drive system of claim 1, wherein said flexible drive shaft is placed in a housing surrounding said drive shaft as a measure of safety.

10. The auxiliary power drive system of claim 1, wherein said rear wheel is supported in an oscillating frame which pivots around a pivot point located on a basic frame of said bicycle, said power train delivers power to said rear wheel by way of a worm drive system including a telescoping coupling in said drive shaft.

11. The auxiliary power drive system of claim 10 including a shock absorbing spring placed between said oscillating frame and said basic frame of said bicycle.

12. The auxiliary power drive system of claim 2, wherein the fuel supply for said internal combustion is located in a container which constitutes a horizontal bar on said bicycle.

13. The auxiliary power drive system of claim 3, wherein said rechargeable batteries are located in a horizontal bar of said bicycle.

* * * * *